Oct. 24, 1933.  F. O. AGNER ET AL  1,931,482
MACHINE FOR SEVERING BAG TUBES
Filed March 15, 1928  4 Sheets-Sheet 3
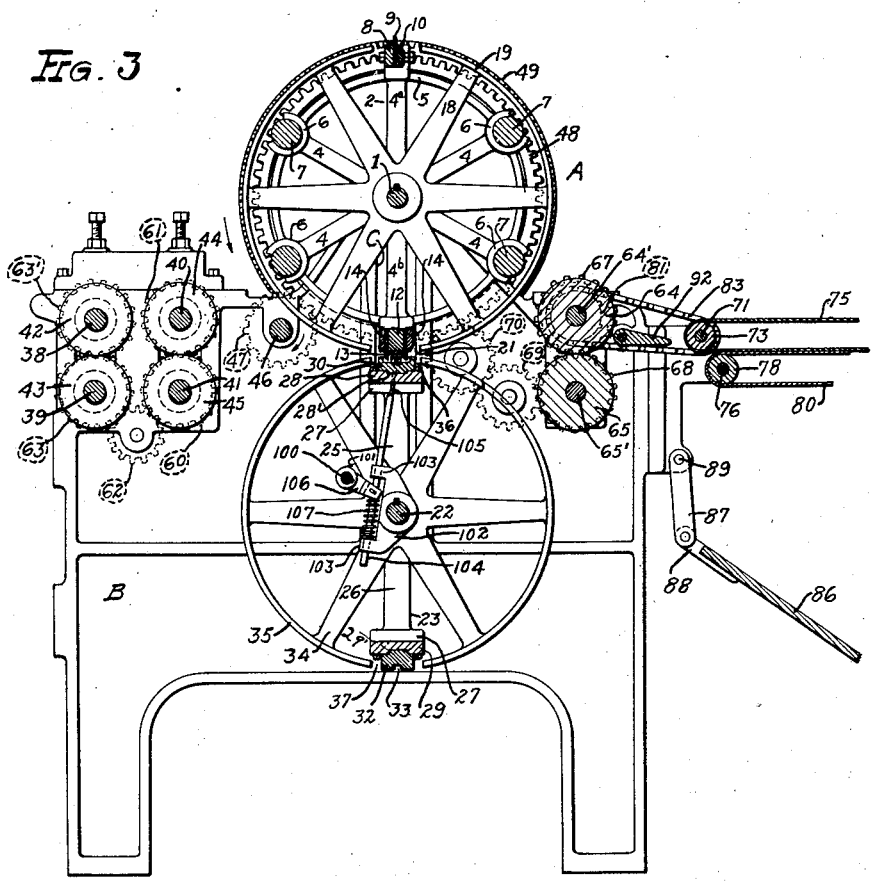
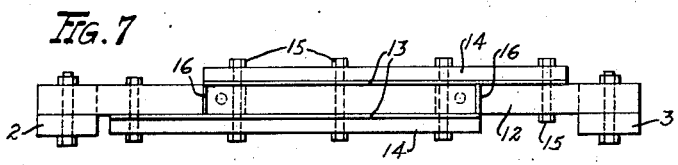
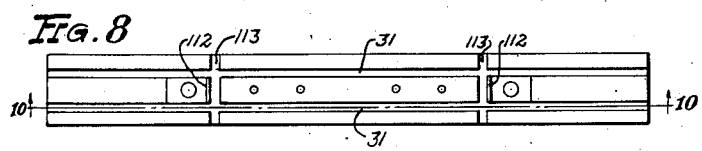
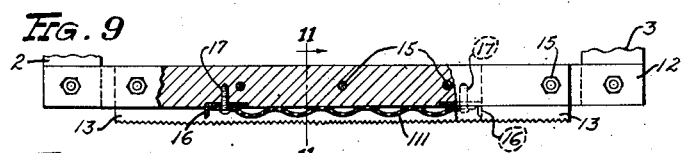
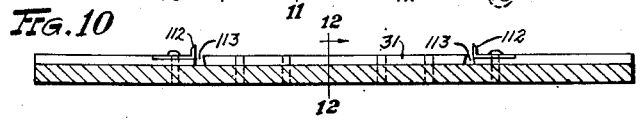
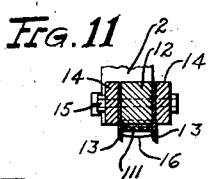
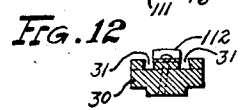
INVENTORS
R. E. PIERCE
F. O. AGNER
C. A. HAUX
BY J. H. G. Cook
ATTORNEY Oct. 24, 1933.  F. O. AGNER ET AL  1,931,482
MACHINE FOR SEVERING BAG TUBES
Filed March 15, 1928   4 Sheets-Sheet 4
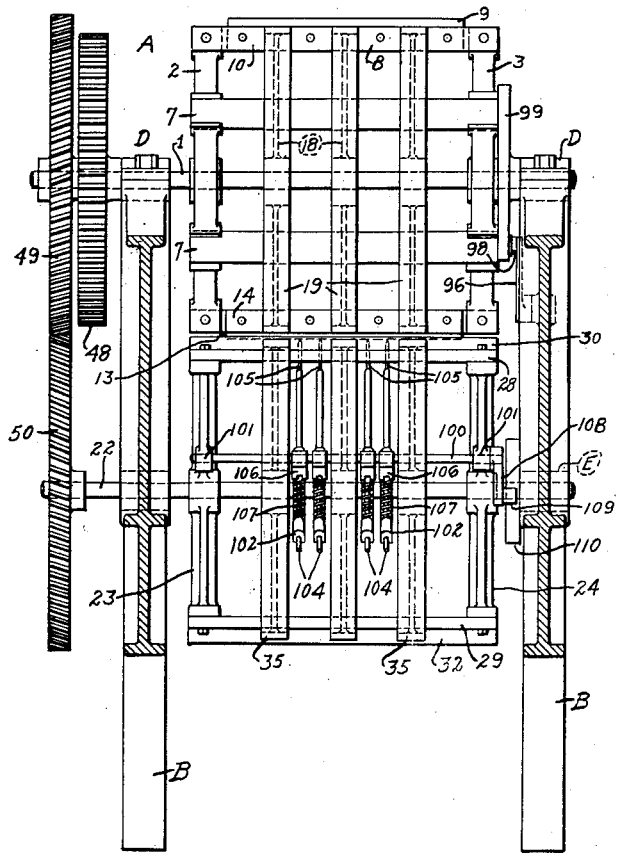
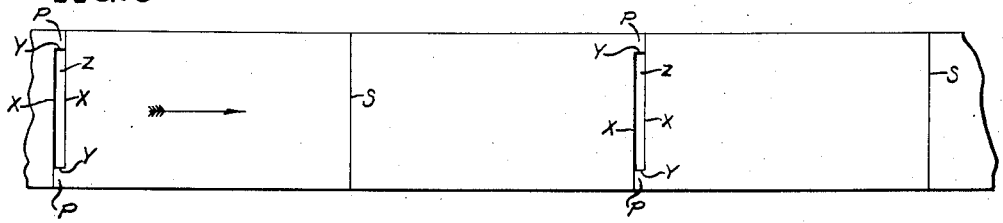
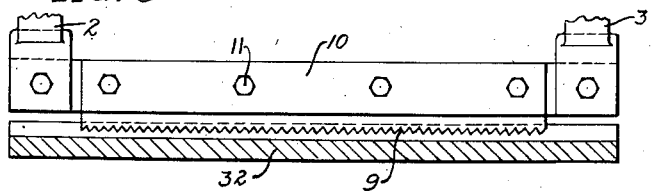
INVENTORS
R. E. PIERCE
F. O. AGNER
C. A. HAUX
BY J. H. Cook
ATTORNEY Patented Oct. 24, 1933

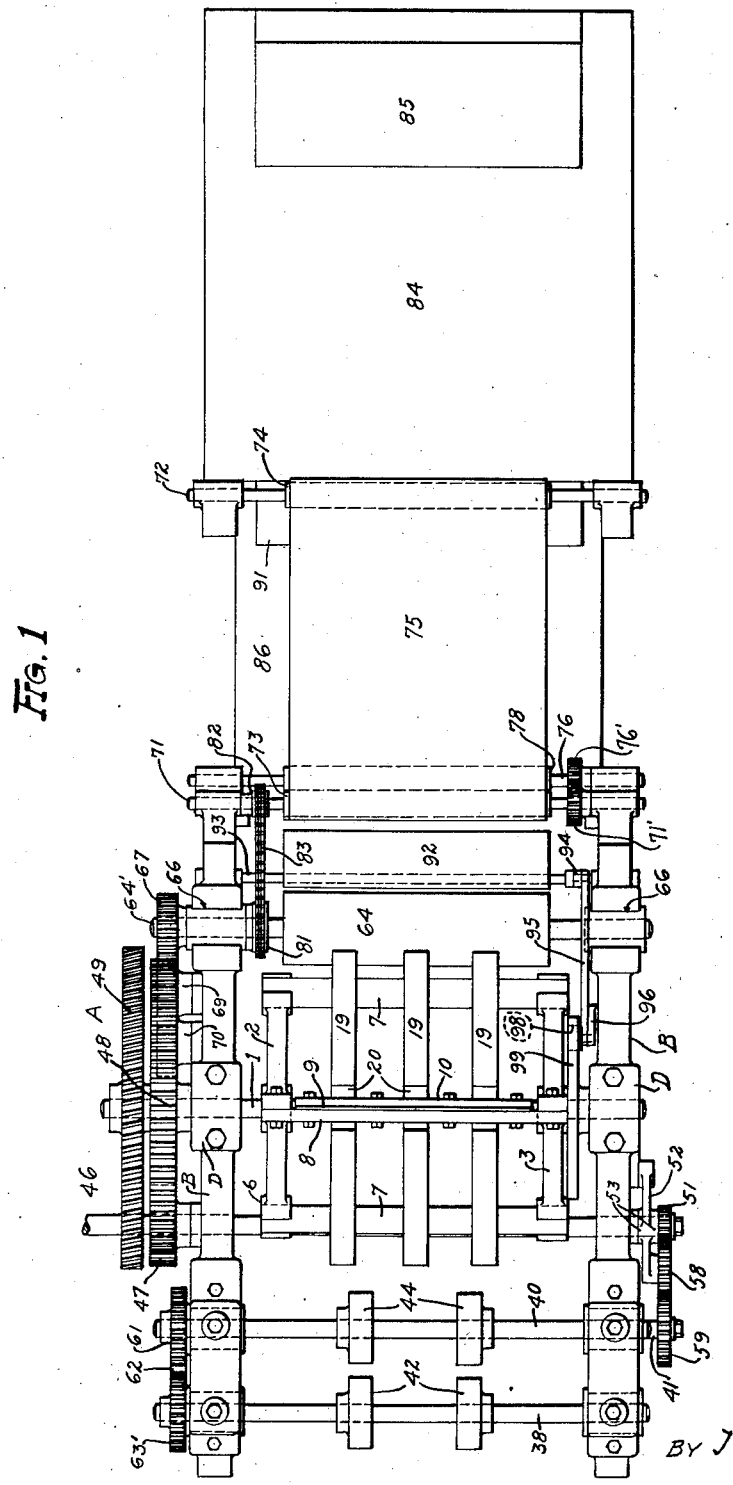

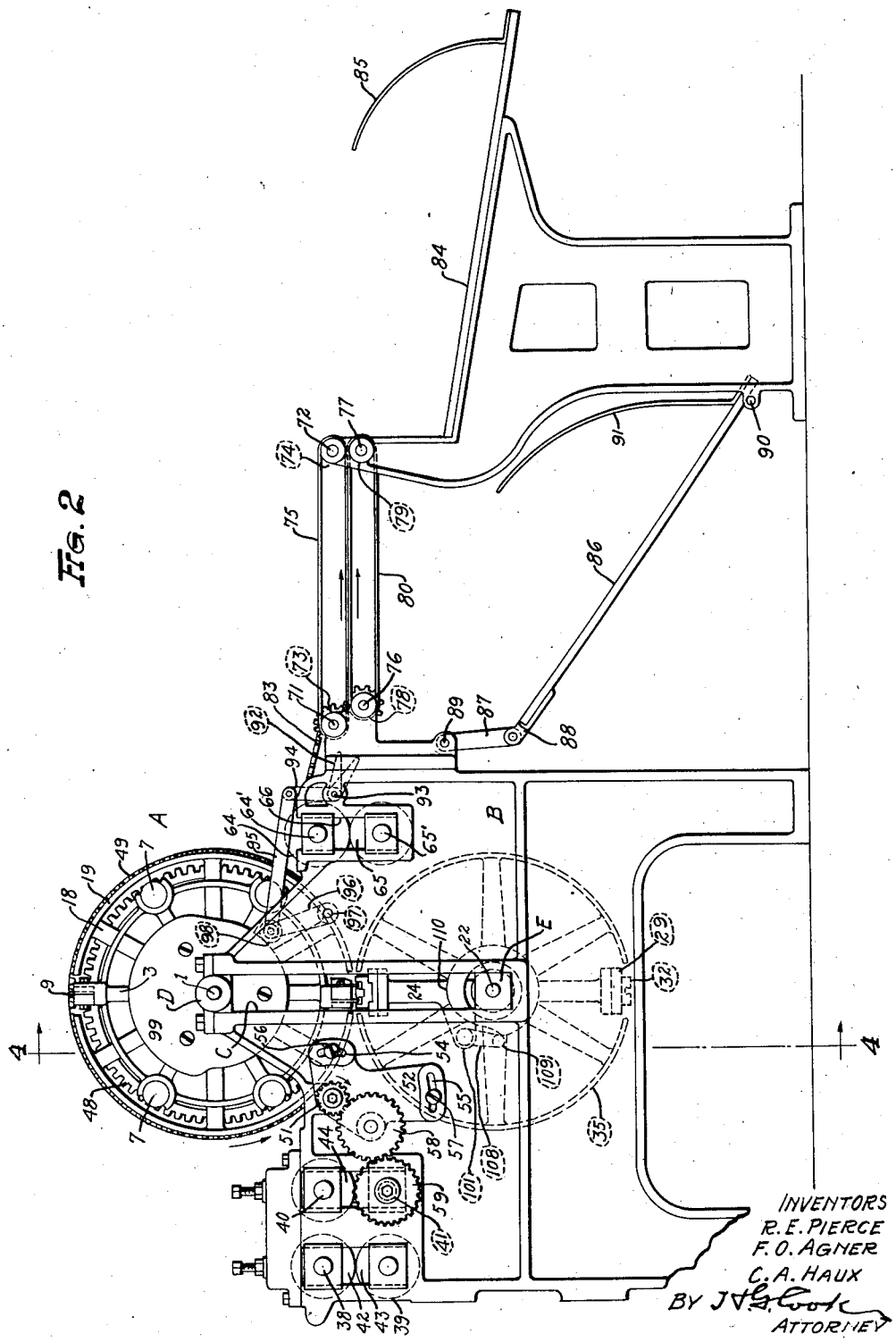

1,931,482

UNITED STATES PATENT OFFICE 1,931,482

MACHINE FOR SEVERING BAG TUBES

Frank O. Agner and Carl A. Haux, Peoria, Ill., and Robert E. Pierce, St. Louis, Mo., assignors to Bemis Bro. Bag Company, St. Louis, Mo., a corporation of Missouri Application March 15, 1928. Serial No. 261,948

14 Claims. (Cl. 93—33)

This invention relates to machines for severing bag tubes, and has for its predominant object the production of a relatively simple and efficient machine of this type which involves the use of rotary cutting means in a manner to permit the severing of bag tubes without interrupting the forward movement thereof.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. 1 is a plan view of the improved severing machine.

Fig. 2 is a side elevation of the machine illustrated in Fig. 1.

Fig. 3 is a vertical section taken through the machine, the delivery end portion of the machine being broken away to conserve space.

Fig. 4 is a cross section taken approximately on the line 4—4 of Fig. 2, looking in the direction indicated by the arrow.

Fig. 5 is a plan view of a bag tube showing the manner in which the same is cut by our improved machine.

Fig. 6 is a fragmentary section on an enlarged scale showing the manner in which a cutting element carried by the upper rotary member of the cutting means cooperates with an element carried by the lower rotary member of said cutting means to cut a bag tube.

Fig. 7 is a plan view showing the means for retaining in place cutting elements associated with the upper rotary member of the cutting means which produce the angular cuts in the bag tube.

Fig. 8 is a plan view of the element associated with the lower rotary member which cooperates with the elements shown in Fig. 7 to cut a bag tube.

Fig. 9 is a view, partly in elevation and partly in section, of the parts shown in Fig. 7.

Fig. 10 is a section on line 10—10 of Fig. 8.

Fig. 11 is a section on line 11—11 of Fig. 9.

Fig. 12 is a section on line 12—12 of Fig. 10.

In the drawings, A designates our improved severing machine, which includes a frame for supporting the various elements of which the machine is comprised, said frame being composed of a pair of spaced side members B. The side members B of the frame are provided with oppositely disposed guideways C arranged approximately perpendicularly, and located at the upper ends of the guideways C are bearings D in which a shaft 1 is mounted for axial rotation, said shaft 1 being extended transversely of the machine, as shown clearly in Fig. 1. Mounted on the shaft 1 and spaced apart from each other in a direction longitudinally thereof is a pair of circular end members 2 and 3, each of said end members comprising a hub portion from which a plurality of radial spokes 4 are extended. At the outer ends of the spokes 4 each of the end members is provided with a circular band 5, and at the points where certain of said spokes join said circular band said end members are provided with semicircular receptacles or pockets 6 (Fig. 3). The receptacles 6 of the oppositely disposed end members 2 are in alinement with each other transversely of the machine, and located in the pairs of horizontally alined receptacles are the opposite end portions of bars 7 which extend transversely of the machine from the end member 2 to the end member 3.

The end members 2 and 3 are provided each with a pair of alined spokes $4^a$ and $4^b$, which at their outer ends extend beyond the circular band 5, and extended from the outer end portion of the spoke $4^a$ of one of said end members to the outer end portion of the spoke $4^a$ of the oppositely disposed end member is a bar 8, said bar being rigidly fixed to said spokes so as to move therewith.

9 designates a cutting element in the form of a straight blade, said cutting element being interposed between the bar 8 and a removable bar 10, and said cutting element and the removable bar 10 being secured in place by suitable fastening devices, such as the bolts 11 which pass through apertures in the bars 8 and 10 and in the cutting element 9. The cutting element is provided with a sharpened cutting edge at its outer edge, which preferably, though not necessarily, is serrated.

The spokes $4^b$ are preferably of increased width at their outer end portions, and extended from the outer end portion of the spoke $4^b$ of the end member 2 to the outer end portion of the spoke $4^b$ of the end member 3 is a bar 12 (Fig. 3), said bar being rigidly fixed to the oppositely disposed end members in any suitable manner, so that said bar will move with said end members. Arranged in contact with the opposite side faces of the bar 12 is a pair of approximately parallel cutting elements 13, said cutting elements being arranged to overlap each other in a direction longitudinally of the bar 12 as shown in Fig. 7, and being retained in place by bars 14 between which and the opposite outer faces of the bar 12 said cutting elements 13 are interposed. The bars 14 and cutting elements 13, as well as the bar 12, are provided with apertures through which bolts or other suitable fastening devices 15 are extended to secure said elements together.

As shown clearly in Figs. 3, 9 and 11, the cutting elements 13 are extended some distance outwardly from the adjacent outer face of the bar 12, and the cutting edges of said cutting elements at the outer edges thereof are preferably serrated. Fixed to the bar 12 and extended transversely between the parallel cutting elements 13 is a pair of relatively short cutting elements 16, said cutting elements 16 being angular in form and being secured to the bar 12 by suitable fastening devices 17. The cutting elements 16 are located at ends of the respective cutting elements 13, each of said cutting elements 16 being extended from an end of one of the cutting elements 13 to the portion of the other cutting element 13 which overlaps said end of the first mentioned cutting element 13. The relatively short cutting elements 16, as shown clearly in Figs. 9 and 11, extend outwardly beyond the outer end face of the bar 12, and the outer edges of said cutting elements are preferably smooth and are curved slightly in the direction of their length, as shown in Fig. 11.

Interposed between the end members 2 and 3 and spaced longitudinally of the shaft 1 is a plurality of members 18, each of said members comprising a hub portion from which spokes are extended radially, and at the outer ends of said spokes each of said members includes a circular band 19. The band 19 of each of the members 18 is provided with a space 20 through which the cutting element 9 extends, and said band is provided also with a similar space 21 through which the cutting elements 13 and 16 extend (Figs. 1 and 3), the bars which retain said cutting elements in place likewise being extended a slight distance through said spaces.

The elements of which the end members 2 and 3 are comprised, that is, the hub portions, spokes and circular bands 5, are either formed integrally with each other or are rigidly fixed together to produce a unitary structure. In like manner, the hub portions, spokes and circular bands 19 comprising the members 18 form unitary structures, and as the end members 2 and 3 and the members 18 are rigidly fixed to the shaft 1 and hence rotate therewith, the combined end members and intermediate members produce a rotary member which supports the cutting elements 9, 13 and 16. Also, it is pointed out in connection with the rotary member referred to that the bars 7 balance said rotary member, thus eliminating any likelihood that the cutting elements 9, 13 and 16 and the bars associated therewith would destroy the balance of the rotary member and thus interfere with the smooth rotation thereof.

Associated with the guideways C, and in perpendicular relation with the bearings D located at the upper ends thereof, is a pair of horizontally alined bearings E, and mounted for axial rotation in said bearings E is a shaft 22 which is extended transversely of the machine in vertical alinement with the shaft 1 (Fig. 3). Rigidly fixed on the shaft 22 in approximate vertical alinement with the end members 2 and 3 mounted on the shaft 1 is a pair of end members 23 and 24, said end members comprising each a hub portion from which arms 25 and 26 are extended outwardly in opposite directions, each of said arms being provided at its outer end with a flat flange 27 and said arms being arranged in alinement with each other (Fig. 3). Extended transversely of the machine from the flat flange 27 associated with the arm 25 of the end member 23 to the flat flange 27 associated with the arm 25 of the end member 24, is a bar 28, the opposite end portions of said bar being secured to said flat flanges in any suitable manner, and said bar being preferably provided with a groove 28' formed longitudinally thereof, as shown in Fig. 3. In like manner, a bar 29 is extended from the flat flange associated with the arm 26 of the end member 23 to the flat flange associated with the arm 26 of the end member 24, said bar being secured in any suitable manner at its opposite ends to said flanges and said bar 29 having a groove 29' formed longitudinally thereof. Supported by the bar 28 is an elongated member 30 which extends from end to end of said bar and is provided with an extension arranged to project into the groove 28' formed in said bar. The member 30 is secured to the bar 28 in any convenient manner, and said member is provided at its face opposite to the face thereof which contacts with the bar 28 with a pair of grooves 31 having inclined side walls which produce what resembles dovetail grooves. The grooves 31 are open at the face of the bar adjacent to which they are located, as shown in Fig. 12.

Supported by the bar 29 is an elongated member 32 (Fig. 3) which extends longitudinally from end to end of said bar, said member 32 being fixed to said bar in any suitable manner and being provided with a projecting portion which extends into the groove 29' formed in said bar. The member 32 is provided at its face which is opposed to the face thereof located in contact with the bar 29 with a groove 33, said groove being extended from end to end of said member 32 and having inclined side walls to produce what resembles a dovetail groove.

Mounted fixedly on the shaft 22 and spaced longitudinally thereof intermediate of the end members 23 and 24 is a plurality of members 34, said members comprising each a hub portion, a plurality of spokes extended outwardly from said hub portion, and a circular band 35 at the outer ends of said spokes. The circular bands of the various members 34 are provided with horizontally alined spaces 36 through which the member 30 extends, and said circular bands are also provided with horizontally alined spaces 37 through which the member 32 extends (Fig. 3). The hub portions, spokes and circular bands comprising the respective members 34 are either integrally formed or are secured together to produce unitary structures, and because said members 34, as well as the end members 23 and 24, are fixed to the shaft 22, a unitary rotary member is provided which cooperates with the unitary rotary member supported by the shaft 1 to sever the bag tubes in a manner to be hereinafter set forth.

Arranged at the intake end of the machine, which is the end thereof shown at the left-hand side of Figs. 1, 2 and 3, is a plurality of shafts 38, 39, 40 and 41. The shafts referred to are extended transversely of the machine, being supported at their opposite end portions in suitable bearings associated with the side members B, so that they may rotate axially. Mounted fixedly on each of the shafts 38, 39, 40 and 41 is a pair of feed rollers which are spaced longitudinally of said shaft, the feed rollers on the shafts 38, 39, 40 and 41 being designated by the reference characters 42, 43, 44 and 45, respectively. The feed rollers on the shafts 39 and 41, which are the lower shafts, are in vertical alinement with the rollers on the shafts 38 and 40, respectively, and the peripheral faces of the rollers 42—43 and the rollers 44—45 are almost in contact with each other, the spaces between the peripheral faces of the rollers referred to being just sufficient to permit passage therethrough of the bag tube to be severed.

Extended transversely of the machine and mounted for axial rotation in suitable bearings associated with the side members b of the frame of the machine, is the drive shaft 46 of the machine, said drive shaft having a pinion 47 fixedly mounted thereon at a point outside of the frame of the machine, as shown in Fig. 1, which pinion meshes with a larger gear wheel 48 rigidly mounted on the shaft 1. Rigidly mounted on the shaft 1 adjacent to the gear wheel 48 is another gear wheel, preferably a helical gear 49, which meshes with a similar helical gear 50 rigidly mounted on the shaft 22 (Fig. 4). In view of the arrangement of the gears just referred to, it is plain that rotary motion applied to the drive shaft 46 in any suitable manner will in turn be imparted through the pinion 47 and gear wheel 48 to the shaft 1 to rotate the elements fixed to said shaft, and rotary motion of the shaft 1 will, in turn, be transmitted through the operation of the helical gears 49 and 50 to the shaft 22, whereby the elements fixed to said shaft 22 will be subjected to rotary motion.

Fixed to the drive shaft 46 at the opposite side of the machine to which the pinion 47 is located is a pinion 51, and mounted in said drive shaft, so that it is capable of slight swinging motion thereabout, is a plate 52, said plate having an opening formed therethrough about which bosses 53 are formed, which bosses extend outwardly from the plate in opposite directions (Fig. 1). As stated, the plate is loosely mounted on the shaft 46 so that it may swing with respect thereto, and to limit and prevent the swinging motion of said plate about said shaft we provide the same with arcuate slots 54 and 55 (Fig. 2), through which screw-threaded elements 56 and 57 are extended. The screw-threaded portions of the elements 56 and 57 are screwed into screw-threaded apertures in the side members B, so that said elements may be screwed inwardly to cause the head portions thereof to frictionally contact with portions of the plate adjacent to the arcuate slots 55 and 56, whereby swinging movement of said plate will be prevented. Rotatably mounted on the plate 52 is a gear wheel 58, said gear wheel being movable with said plate when same is subjected to swinging movement with respect to the drive shaft 46.

Fixedly mounted on the shaft 41 in such position that it will mesh with the gear wheel 58 is a gear wheel 59, and fixedly mounted at the opposite end of said shaft 41 is a gear wheel 60 which, in turn, meshes with a similar gear wheel 61 fixed to the shaft 40. The gear wheel 60 meshes with an intermediate gear wheel 62 (Fig. 3) supported by the frame of the machine, and said intermediate gear wheel in turn meshes with a gear wheel 63 mounted on the shaft 39, the last mentioned gear wheel in turn meshing with a gear wheel 63' fixed to the shaft 38. In view of the arrangement of the gear wheels just described, the drive shaft, in addition to rotating the shafts 1 and 22 axially, will in like manner rotate the shafts 38, 39, 40 and 41, so as to cause the feeding rollers thereon to feed the bag tubes longitudinally of the machine, said bag tubes being passed between the cooperating feeding rollers into the machine. Also, it is plain that when it is desired to change the size of the gear wheel 58 to vary the peripheral speed of the feed rollers, the elements 56 and 57 (Fig. 2) may be unscrewed to remove the head portions thereof from contact with the plate 52, after which the larger or smaller gear wheel may be substituted for the gear wheel arranged on said plate and the plate moved to a position where the substituted gear wheel would mesh with the gear wheel 59 on the shaft 41, where said plate would be secured in place by the elements 56 and 57.

Located at the side of the cutting mechanism opposite to that at which the feeding rollers already referred to are located is a pair of feeding rollers 64 and 65, said feeding rollers 64 and 65 being fixedly mounted on shafts 64' and 65' arranged for axial rotation in suitable bearings arranged in perpendicular guideways 66 formed in the side members B. Mounted fixedly on the shaft 64' at an end thereof is a gear wheel 67 which meshes with a similar gear wheel 68 fixed to the shaft 65', and arranged in mesh with the gear wheel 68 is a smaller gear wheel 69 which in turn meshes with a gear wheel 70. The gear wheel 70 is in mesh with the larger gear wheel 48 fixed to the shaft 1, and because of the train of gearing between the gear wheel 48 and the shaft 65' it is plain that said shaft 65' will be rotated when the gear wheel 48 is in motion. Also, because of the gear wheel 67 and 68 on the shafts 65' and 64', it is obvious that rotary motion will be transmitted from the shaft 65' to the shaft 64', whereby the feed rollers 64 and 65 will be rotated in unison. The feeding rollers are so located with respect to the cutting mechanism that the bag tube being acted on by the machine will be received between the rollers 64 and 65 as said bag tube leaves said cutting mechanism and the forward movement of said bag tube will be continued by said feeding roll.

71 designates a shaft which extends transversely of the machine to the right of the feeding rollers 64 and 65 in Figs. 1, 2 and 3, and 72 designates a similar shaft which is spaced from the shaft 71 in a horizontal direction and toward the discharge or right-hand end of the machine in Figs. 1 and 2. The shafts are mounted for axial rotation in suitable bearings associated with the frame of the machine, and said shafts are provided with pulleys 73 and 74, respectively, over which an endless belt 75 operates. As shown in Fig. 1, the belt 75 is of substantial width when compared with the width of the machine. Arranged below the belt 75 is a shaft 76, which also is extended transversely of the machine and is mounted for axial rotation in suitable bearings associated with the machine frame, and 77 designates a similar shaft which is positioned below the shaft 72 and is likewise mounted for axial rotation in suitably supported bearings. Rigidly fixed to the shafts 76 and 77, respectively, are pulleys 78 and 79 over which an endless belt 80 operates, the upper flight of the belt 80 being in contact with the lower flight of the belt 75, as shown clearly in Figs. 2 and 3.

Fixed to the shaft 64' is a sprocket wheel 81 and fixed to the shaft 71 is a smaller sprocket wheel 82. 83 designates a sprocket chain which operates over the sprocket wheels 81 and 82, whereby rotary motion will be imparted to the shaft 71 to cause the endless belt 75 to be driven in the direction indicated by the arrow in Fig. 2. Also, the shaft 71 has a pinion 71' fixed to it at one of its ends which meshes with a similar pinion 76' fixed to the shaft 76 at an end thereof, whereby rotary motion will be transmitted from said shaft 71 to said shaft 76, thus causing the endless belt 80 to be driven in the direction indicated by the arrow adjacent to said belt in Fig. 2.

Arranged at the extreme right-hand end of the machine as shown in Fig. 2 is an inclined shelf 84, said inclined shelf being supported by the frame of the machine at a point some distance below the discharge ends of the belts 75 and 80. 85 designates a curved guard which is fixed to the inclined shelf 84 at the outer end thereof. The function of the guard 85 is to act as a stop for the severed sections of the bag tube as said sections are delivered to the inclined shelf 84. 86 designates a second inclined shelf which is secured at one of its ends to a link 87, said link being pivotally secured at one of its ends to an element 88 fixed to the inclined shelf 86 and at its other end said link is pivotally attached at 89 to a portion of the frame of the machine. At the end of the inclined shelf 86 opposite to the end thereof attached to the link 87 said shelf rests on a rod 90 which extends transversely of the machine (Fig. 2.), and at said end of said shelf 86 the shelf is provided with a curved guard 91, as shown in the view mentioned.

Arranged transversely of the machine at a point intermediate of the feeding rollers 64 and 65 and the endless belts 75 and 80 is a deflector 92 (Figs. 1 and 2) which is rigidly mounted on a rockable shaft 93. The rockable shaft 93 is mounted in suitable bearings associated with the side members of the frame of the machine, and said shaft is extended transversely of said machine. 94 designates an arm which is fixed at one of its ends to the rockable shaft 93, and the opposite end of said arm is pivotally attached to a link 95 (Fig. 2).

96 designates an arm which is pivotally attached at 97 to one of the side members B of the frame of the machine, said arm 96 at its outer end being pivotally attached to the end of the link 95 opposite to the end thereof which is attached to the link 94. Located at the point where the outer end of the arm 96 is attached to the arm 95 is an anti-friction roller 98, said roller being rotatably attached to said elements as shown in Fig. 1. 99 designates a cam which is fixed to the shaft 1, the anti-friction roller 98 being maintained in contact with the peripheral face of said cam as shown in Fig. 2. The cam 99 is of such shape that almost one-half of its peripheral face constitutes the high portion thereof, while the remainder of the peripheral face thereof is the low portion of the cam. When the anti-friction roller 98 is in contact with the low portion of the cam, the deflector 92 is in the upper dotted line position in which it is shown in Fig. 2. However, as the rotation of the cam brings the high portion of the cam in contact with the anti-friction roller 98, said roller and with it the outer ends of the arms 94 and 96 and the link 95 will be moved forwardly in Fig. 2, thereby rocking the shaft 93 and moving the outer end of the deflector downwardly approximately to the lower position in which said deflector is shown by dotted lines in Fig. 2. When the deflector 92 is in the upper dotted line position, as shown in Fig. 2, the bag tube sections passing from the cutting mechanism may pass from the feeding rollers 64 and 65 and between the contacting flights of the endless belts 75 and 80, said endless belts 75 and 80 conducting said tube sections forwardly and discharging same on the inclined shelf 84. However, when the deflector is in its lowered position, as indicated by dotted lines in Fig. 2, the bag tube sections instead of passing between the contacting flights of the endless belts 75 and 80 will be deflected downwardly onto the inclined shelf 86.

By referring to Fig. 5, it will be noted that the cutting elements 13 form cuts X in the bag tube, which extend inwardly from the opposite side edges of said bag tube, said cuts terminating short of the edge of the bag tube opposite to that at which they start and overlapping each other in a direction transversely of the bag tube. It will also be noted that the cutting elements 16 form short cuts Y, which extend longitudinally of the bag tube from the ends of said cuts X which are located inwardly from the side edges of the bag tube to overlapping portions of associated cuts. In view of this arrangement of the cuts in the bag tube, it is apparent that each time the cuts X and Y are formed in a bag tube a portion Z of the bag tube results which is entirely enclosed within the cuts. Our improved machine includes means which will now be described adapted to engage the portions Z, said means being so operated as to displace or carry said portions Z away from the bag tube whereby any likelihood that the loose pieces Z will be carried along with the bag tube as the same moves toward the discharge end of the machine is eliminated.

100 designates a shaft which is extended transversely of the machine (Figs. 3 and 4), said shaft being mounted for rotary movement in bearings 101 formed on the end members 23 and 24 so that it will rotate with said end members about the shaft 22. Rigidly mounted on the shaft 22 and spaced longitudinally thereof (Fig. 4) is a plurality of members 102, each of said members being provided with an opening through which the shaft 22 extends, and each of said members also being provided with a pair of spaced apart lugs 103 extended outwardly from the main body portion of the member. The pairs of lugs 103 associated with the respective members 102 have alined apertures formed therethrough, and extended through the apertures formed in the lugs of the respective members 102 are rods 104, each of which is provided with an end portion 105 of reduced diameter. The reduced end portions of the rods 104 are extended through apertures formed through the bar 28 and member 30, and said rods are capable of reciprocatory movement to cause the outer ends thereof to be extended beyond the outer face of the member 30. 106 designates arms which are rigidly fixed to the shaft 100, there being one of the arms 106 associated with each individual member 102 and said arms each having a bifurcated end portion which is located between the lugs 103 of the member with which said arm is associated. The bifurcated portions of the respective arms 106 embrace the associated rods 104, said rods and said bifurcated portions of said arms being connected together by means of slot and pin connections, as shown in Fig. 3. Interposed between one of the lugs of each member 102 and the bifurcated portion of the associated arm 106 is a coil spring 107, said coil springs being arranged to surround the rods 104 and tend to move the bifurcated portions of the arms away from the lugs against which the opposite ends of the coil springs bear. Fixed on the shaft 100 at an end thereof is an arm 108 (Fig. 4), which arm is provided with an anti-friction roller 109 at its outer end. The anti-friction roller 109 contacts with the peripheral face of a cam 110, which cam is fixed stationary to the frame of the machine. Arranged between the cutting elements 13 and between the cutting elements 16 (Figs. 9 and 11) is a buffer or pad 111 formed of yielding material, such as rubber, said buffer or pad being preferably more or less corrugated and being held in place in any convenient manner.

The stationary cam 110 is provided with a high portion and a low portion, as shown in Fig. 2, and inasmuch as the shaft 100 and the arm 108 rotate with the end members 23 and 24 about the shaft 22, the anti-friction roller carried by said arm 108 will travel around the periphery face of the cam 110 in contact therewith, the coil springs forcing said roller into very close contact with the peripheral face of said cam. When the anti-friction roller 109 on the arm 108 is in contact with the high portion of the cam, the outer ends of the rods 104 will be maintained in the positions in which they are shown in Fig. 3, in which positions they do not extend beyond the outer face of the members 30. However, when the anti-friction roller 109 moves into contact with the low portion of the cam in response to pressure of the coil spring 107, the rods 104 will be moved upwardly so that their outer ends are projected beyond the outer face of the member 30 and into contact with the yieldable buffer or pad 111.

In the operation of the improved severing machine disclosed herein, the bag tube passes from the machine by which it is formed in continuous form and said bag tube passes between the feeding rollers 42, 43, 44 and 45 by which it is fed toward the cutting means of the machine. The bag tube passes between the circular bands of the members 18 on the shaft 1 and the circular bands of the members 34 on the shaft 22 which serve to guide said bag tube longitudinally of the machine. The cutting element 9 and the cutting elements 13 and 16 are rotating with the shaft 1, and in like manner the members 32 and 30 are rotating with the shaft 22 and said members 32 and 30 are so positioned and timed that they will move into cooperation with the cutting elements 9 and 13—16, respectively, when each of said members reaches a point in approximate vertical alinement with the shafts 1 and 22. When this cooperation between the cutting element 9 and the member 32 takes place, the cutting edge of said cutting element 9 passes into the groove 33 in the member 32, and an edge of the groove will cooperate with the cutting element to cut the bag tube on a straight line, as indicated by the reference character S in Fig. 5. This cutting operation takes place while the cutting element 9 is rotating and while the bag tube is in motion. On continued operation of the shafts 1 and 22, the cutting edges 13—16 will move into cooperating engagement with the member 30 at the cutting point, which, as already stated, is at the top of the lower and bottom of the upper rotary cutting members, as shown in Fig. 3.

When the cutting elements 13—16 and the member 30 cooperate as described and as shown in Fig. 3, the cutting edges of the cutting elements 13 will pass into the grooves 31 in said member 30, while said cutting elements 16 will cooperate with the cutting elements 112 (Fig. 10) and will be extended into the grooves 113 adjacent to said cutting elements 112, whereby the bag tube will be cut as indicated at X—Y in Fig. 5, edges of the grooves 31 and the cutting elements 112 cooperating to perform said cutting operation. The rotary members on which the cutting elements 9 and 13—16 and the members 32 and 30 are mounted are arranged to have a peripheral speed which is slightly greater than the speed of travel of the bag tube, hence cutting elements will be pulled rapidly through the bag tube when the cutting operation takes place, whereby a tearing action will result in the case of the cutting elements 9 and 13. With respect to the cutting elements 16, however, which are not serrated and are slightly curved at their cutting edges, a shearing action takes place. As the cutting operation performed by the cutting elements 13—16 is completed, the anti-friction roller 109 will move into contact with the low portion of the cam 110, whereupon the upper ends of the rods 104, which are pointed, will be extended beyond the outer face of the member 30 and projected through the portion Z (Fig. 5) of the bag tube, the yielding buffer or pad 111 forcing the portion Z onto the rods 104 longitudinally thereof, whereupon said portion Z of the bag tube will be displaced or carried away from the bag tube by said rods 104 as said rods continue to rotate with the rotary member with which they are associated. When the anti-friction roller 109 again contacts with the high portion of the cam 110 the rods 104 will be withdrawn from beyond the outer face of the member 30, and the portion Z will be discharged from said rods.

The feeding rollers 64 and 65 are driven by a train of gear wheels so proportioned that the peripheral speed of said feed rollers is slightly greater than the speed of movement of the rotary cutting members and of the speed of movement of the bag tube, hence the speed of movement of the individual bag section being fed by said rollers 64 and 65 will be accelerated to open the gap between said bag section and the succeeding bag section.

By referring now to Fig. 5 it will be noted that each section of the bag tube is provided with a projection P, and it will also be plain after considering this view that in the case of every second bag section the projections are on the same side of the bag tube, while in the case of connecting or adjacent sections the projections P are at opposite sides of the bag tube. It is desirable that the bag tube sections be arranged in stacks made up of sections having the projections P at corresponding sides of said sections, and this is accomplished by the use of the deflector 92. As already described, operation of the deflector 92 is controlled by a cam 99 and this cam is so shaped that as one bag tube section is passing between the feeding rollers 64 and 65 the deflector will be positioned as shown by full lines in Fig. 3, thus permitting the bag tube section to pass from the feeding rollers 64 and 65 between the upper and lower flights of the endless belts 75 and 80 by which said section will be discharged onto the inclined shelf 84 (Fig. 2). As the next bag tube section starts between the feeding rolls 64 and 65, the cam will move the outer end of the deflector 92 downwardly, whereby said next section will be deflected downwardly so that it will be deposited on the inclined shelf 86. In view of this arrangement, bag tube sections will be deposited alternately on the inclined shelves 84 and 86, whereby all of the sections which are stacked on the inclined shelf 84 will have their projections P located at one side of the stack, while the sections stacked on the inclined shelf 86 will have their projections located at the opposite side of the stack.

We claim:

1. A machine for severing bag tubes, comprising means for feeding a bag tube longitudinally, cutting means for cutting said bag tube transversely thereof, reciprocatory means for displacing a portion of the bag tube adjacent to the cut produced therein by said cutting means, and a yieldable pad against which said reciprocatory means moves.

2. A machine for severing bag tubes, comprising means for feeding a bag tube longitudinally, cutting means for cutting said bag tube transversely thereof, reciprocatory means for displacing a portion of the bag tube adjacent to the cut produced therein by said cutting means, and a yieldable pad carried by said cutting means against which said reciprocatory means moves.

3. A machine for severing bag tubes, comprising rotary feeding means for feeding a bag tube longitudinally, rotary cutting means for cutting said bag tube transversely thereof, said rotary cutting means including cutting elements shaped and arranged to produce alternate straight line and angular cuts in said bag tube and the peripheral speed of said rotary cutting means being greater than that of said rotary feeding means, reciprocatory means for displacing a portion of the bag tube adjacent to a cut produced therein by said cutting means, feed rolls arranged to move the bag tube longitudinally away from said cutting means, the peripheral speed of said feed rolls being greater than that of said rotary cutting means so as to separate the sections of the bag tube at the cuts produced by said cutting means, and a pivoted deflector for directing certain sections of the severed bag tube in different directions as they pass from said cutting means.

4. A machine for severing bag tubes comprising, in combination, means for feeding bag tubing longitudinally, means for severing the bag tubing transversely into bag-forming sections, such means including cutting elements of different shapes arranged to produce alternate straight cuts and angular tab-forming cuts in the bag tubing, said cutting elements being arranged so as to follow unswerving arcuate paths at all times during the operation of the machine, and means associated with said severing means and operated in timed relation therewith for directing alternate bag-forming sections of the bag tubing in different directions.

5. A machine for severing bag tubes comprising, in combination, means for feeding bag tubing longitudinally, rotary means for severing the bag tubing transversely into bag-forming sections, such means including cutting elements of different shapes arranged to produce alternate straight cuts and angular tab-forming cuts in the bag tubing, said cutting elements being arranged so as to follow unswerving arcuate paths at all times during the operation of the machine, and means associated with said severing means and operated in timed relation therewith for directing alternate bag-forming sections of the bag tubing in different directions.

6. A machine for severing bag tubes comprising, in combination, means for feeding bag tubing longitudinally, means for severing the bag tubing transversely into bag-forming sections, such means including a straight cutting element and angular, overlapping cutting elements operable to produce alternate straight and angular tab-forming cuts in the bag tubing, said cutting elements being arranged so as to follow unswerving arcuate paths at all times during the operation of the machine, and means associated with said severing means and operated in timed relation therewith for directing alternate bag-forming sections of the bag tubing into separate piles.

7. A machine for severing bag tubes comprising, in combination, means for feeding bag tubing longitudinally, means for severing the bag tubing transversely into bag-forming sections, such means including a straight cutting element and a pair of angular cutting elements arranged to produce alternate straight cuts and angular tab-forming cuts in the bag tubing, said angular cutting elements including approximately parallel spaced portions arranged in overlapping relation and portions arranged at an angle to said spaced parallel portions and extended from one of the spaced parallel portions to the other, said cutting elements being arranged so as to follow unswerving arcuate paths at all times during the operation of the machine, and means associated with said severing means and operated in timed relation therewith for directing alternate bag-forming sections of the bag tubing into separate piles.

8. A machine for severing bag tubes comprising, in combination, means for feeding bag tubing longitudinally, means for severing the bag tubing transversely into bag-forming sections, such means including a straight cutting element and a pair of approximately L-shaped cutting elements arranged to overlap each other transversely and longitudinally of the path of travel of the bag tubing, said cutting elements being arranged so as to follow unswerving arcuate paths at all times during the operation of the machine, and means associated with said severing means and operated in timed relation therewith for directing alternate bag-forming sections of the bag-tubing into separate piles.

9. A machine for severing bag tubes comprising, in combination, means for feeding bag tubing longitudinally, means for severing the bag tubing transversely into bag-forming sections, such means including cutting elements of different shapes arranged to produce alternate straight cuts and angular tab-forming cuts in the bag tubing, said cutting elements being arranged so as to follow unswerving arcuate paths at all times during the operation of the machine, and means including a pivoted deflector associated with said severing means and operated in timed relation therewith for directing alternate bag-forming sections of the bag tubing into separate piles.

10. A machine for severing bag tubes comprising, in combination, means for feeding bag tubing longitudinally, rotary means for severing the bag tubing transversely into bag-forming sections, such means including cutting elements of different shapes arranged to produce alternate straight cuts and angular, tab-forming cuts in the bag tubing, said cutting elements being arranged so as to follow unswerving arcuate paths at all times during the operation of the machine, means comprising a pivoted deflector for directing alternate bag-forming sections of the bag tubing in different directions after same have been cut, and means including a cam movable with said rotary means and a lever associated with said pivoted deflector for operating said pivoted deflector in timed relation with said rotary means.

11. A machine for severing bag tubes comprising, in combination, rotary cutting means for severing bag tubing transversely into bag-forming sections in a manner to provide each bag-forming section with a tab portion at an end thereof whereby a waste portion of the bag tube is left, reciprocating means carried by said cutting means adapted on one stroke to impale a waste portion of the bag tube and upon an opposite stroke at another point in the cycle of the cutting means to strip the waste portion therefrom, and means including a rockable arm for reciprocating said reciprocating means in timed relation with said rotary cutting means.

12. A machine for severing bag tubes comprising, in combination, rotary cutting means for severing bag tubing transversely into bag-forming sections in a manner to provide each bag-forming section with a tab portion at an end thereof whereby a waste portion of the bag tube is left, reciprocating means carried by said cutting means adapted on one stroke to impale a waste portion of the bag tube and upon an opposite stroke at another point in the cycle of the cutting means to strip the waste portion therefrom, means including a rockable arm for reciprocating said reciprocating means in timed relation with said rotary cutting means, and a cam for subjecting said rockable arm to movement.

13. In a mechanism comprising a pair of cooperating rotary cutting elements having means to sever a part of a web of material, a pin slidably mounted in the peripheral wall of one of said rotary elements adjacent to said severing means, an actuating arm pivotally mounted on said rotary element and connected with said pin to project the same beyond the periphery of said element and through the severed part of said web, a stationary cam mounted adjacent to said rotary element, and a second arm rigidly connected with said actuating arm and having a part engaging said cam.

14. A machine for severing bag tubes comprising, in combination, means for simultaneously feeding bag tubing longitudinally, cutting means moving in unswerving circular paths at all times during the operation of the machine, said cutting means being arranged to produce, while the bag tubing is in motion, individual bag sections having projecting tabs and arranged alternately with said projecting tabs leading and trailing, and means for directing alternate bag lengths in different directions.

FRANK O. AGNER.
CARL A. HAUX.
ROBERT E. PIERCE.